United States Patent
Murching

(10) Patent No.: US 6,594,389 B1
(45) Date of Patent: Jul. 15, 2003

(54) REFINING A PIXEL-BASED SEGMENTATION MASK DERIVED BY UNSAMPLING A BLOCK-BASED SEGMENTATION MASK

(75) Inventor: Anil M. Murching, Beaverton, OR (US)

(73) Assignee: Tut Systems, Inc., Pleasanton, CA (US)

( * ) Notice: Subject to any disclaimer, the term of this patent is extended or adjusted under 35 U.S.C. 154(b) by 495 days.

(21) Appl. No.: 09/585,729

(22) Filed: May 31, 2000

(51) Int. Cl.[7] .................................................. G06K 9/34
(52) U.S. Cl. ........................................................ 382/173
(58) Field of Search ................................ 382/168, 480, 382/254–276; 358/450–464

(56) References Cited

U.S. PATENT DOCUMENTS 5,644,386 A * 7/1997 Jenkins et al. ............... 382/224
5,671,294 A * 9/1997 Rogers et al. ............... 382/173
5,768,413 A * 6/1998 Levin et al. ................. 382/173
5,859,891 A * 1/1999 Hibbard ...................... 382/132
6,381,363 B1 * 4/2002 Murching et al. .......... 382/173

FOREIGN PATENT DOCUMENTS

JP         404218883 A    *    8/1992    ........... G06F/15/70

* cited by examiner

Primary Examiner—Jingge Wu
(74) Attorney, Agent, or Firm—Smith-Hill and Bedell

(57) ABSTRACT

A method of refining a pixel-based segmentation mask derived by upsampling a block-based segmentation mask for an image having multiple object classes determines a likelihood that each pixel in the pixel-based segmentation mask exists in each object class. Boundary pixels between bordering classes are extracted and processed to find a true class for each boundary pixel. The pixel-based segmentation mask is then updated with the true class for each of the boundary pixels to produce a smoothed pixel-based segmentation mask.

4 Claims, 2 Drawing Sheets

REFINING A PIXEL-BASED SEGMENTATION MASK DERIVED BY UNSAMPLING A BLOCK-BASED SEGMENTATION MASK

STATEMENT REGARDING FEDERALLY SPONSORED RESEARCH OR DEVELOPMENT

This invention was made with Government support under Agreement No. 70NANB8H4077 awarded by NIST. The Government has certain rights in the invention.

BACKGROUND OF THE INVENTION

The present invention relates to digital data compression, and more particularly to a method of refining a pixel-based segmentation mask derived by upsampling a block-based segmentation mask representing an image.

An image having H×V pixels may be divided into a plurality of blocks, each having dimensions of P×Q pixels. Each block may be classified into one of N classes. This provides a decimated or block-based segmentation mask as shown in FIG. 1 where for ease of illustration there are two classes, I and II, and each pixel of the mask represents a block of P×Q pixels of the full resolution image. When the decimated segmentation mask is upsampled to produce a pixel-based segmentation mask having the same resolution as the full resolution image, the result is a blocky pixel-based segmentation mask, as shown in FIG. 2.

What is desired is a method for refining the blocky pixel-based segmentation mask into a smoother pixel-based segmentation mask.

SUMMARY OF THE INVENTION

Accordingly the present invention provides a method of refining a pixel-based segmentation mask derived by upsampling a block-based segmentation mask for an image to provide a full resolution image without block artifacts. For each block of the block-based segmentation mask a feature vector is obtained which defines one of a plurality of classes to which the block belongs. From the corresponding pixel-based segmentation mask a mean and covariance is defined for each class. For each pixel in the pixel-based segmentation mask the means, covariances and feature vectors are used to determine a likelihood that the pixel belongs to each class. Then a one-pixel wide boundary is defined at each border between adjacent classes in the block-based segmentation mask, and the resulting boundary block "pixels" are upsampled to corresponding boundary pixels for the pixel-based segmentation mask. The true class for each boundary pixel is determined, and the pixel-based segmentation mask is updated accordingly to smooth blockiness artifacts at the borders between classes.

The objects, advantages and other novel features of the present invention are apparent from the following detailed description when read in conjunction with the appended claim and attached drawing.

DETAILED DESCRIPTION OF THE INVENTION

For each block or sample of a full resolution digital image a feature vector, $V_{f(k)}$, is obtained based on suitable criteria, such as by color components as described in co-pending U.S. patent application Ser. No. 09/270,233 entitled "Histogram-Based Segmentation of Objects from a Video Signal via Color Moments" or by texture as described in co-pending U.S. patent application Ser. No. 09/495,597 entitled "A Process to Extract Regions of Homogeneous Texture in a Digital Picture", both Applications being incorporated herein by reference. From the pixels of the corresponding pixel-based segmentation mask derived by upsampling the block-based segmentation mask a mean and covariance for each class are derived as follows:

$$U_{(k)} \triangleq \Sigma_{i \in A(k)} V_{f(i)} / \Sigma_{i \in A(k)} 1$$

$$\Sigma_{(k)} \triangleq \Sigma_{i \in A(k)} V_{f(i)} \cdot V_{f(i)}^T / \Sigma_{i \in A(k)} 1 - U_{(k)} * U_{(k)}^T$$

where A(k) is the set of all pixels in the pixel-based segmentation mask that belong to the class "k". Based upon the pixel-based segmentation mask, $U_{(k)}$ and $\Sigma_{(k)}$ may be computed for all N classes.

Then the likelihood that a pixel "i" belongs to a particular class "k" is $$P_{(k)}(V_{f(i)}) \triangleq \exp\{-\frac{1}{2}[V_{f(i)} - U_{(k)}]^T \Sigma_{(k)}^{-1}[V_{f(i)} U_{(k)}] - \frac{1}{2}\ln[\det(\Sigma_{(k)})]\}$$

Figure 1:
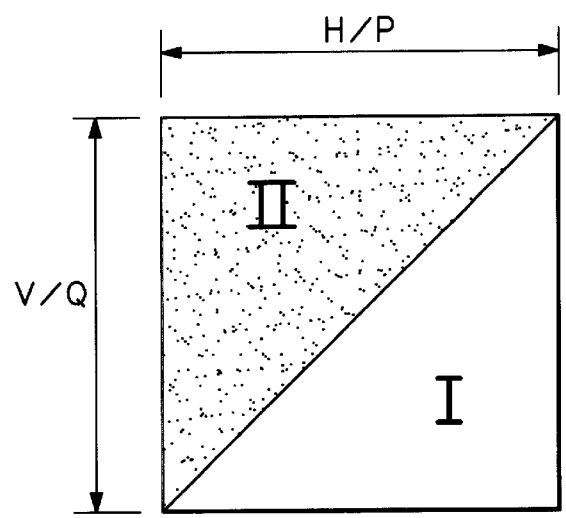
FIG. 1 is a pictorial view of a block-based segmentation mask for an image.
Figure 2:
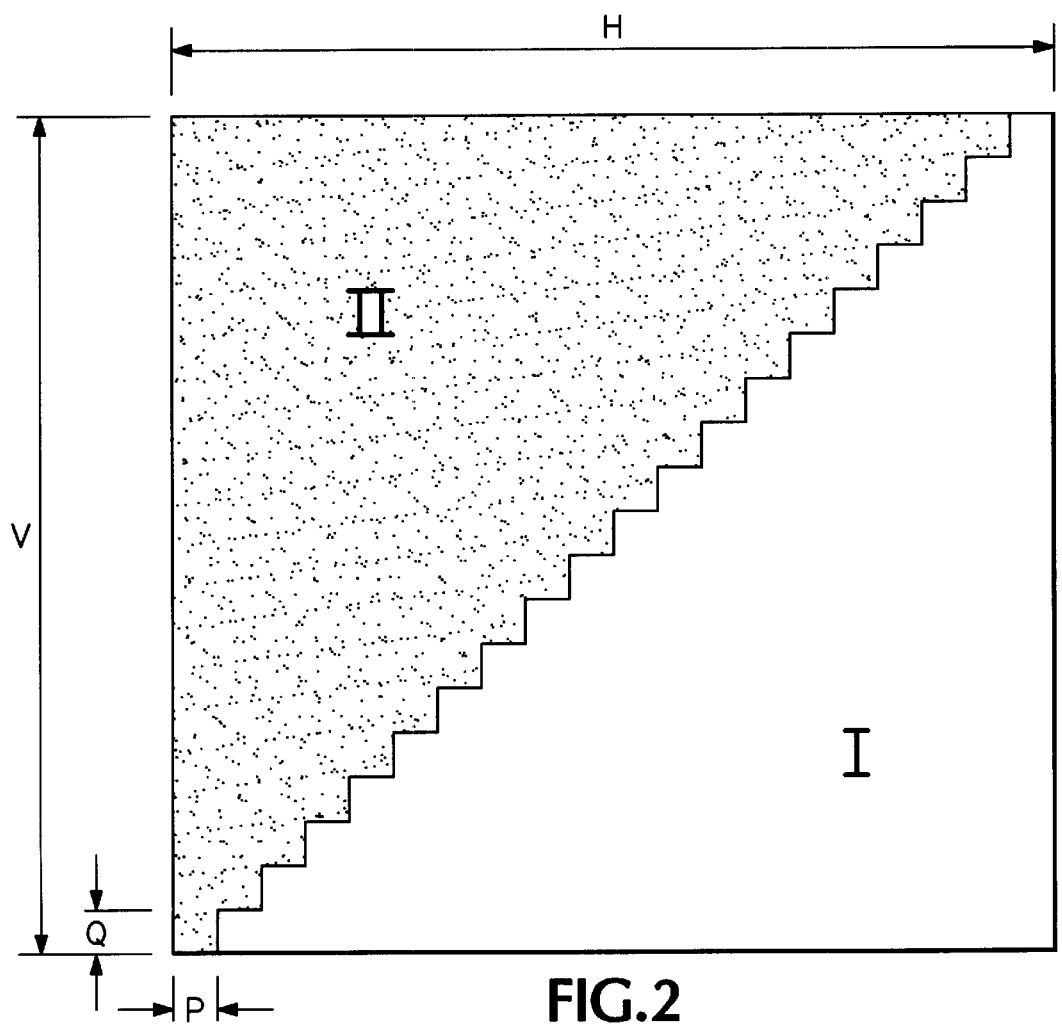
FIG. 2 is a pictorial view of an upsampled block-based segmentation mask for a full resolution image.
Figure 3:
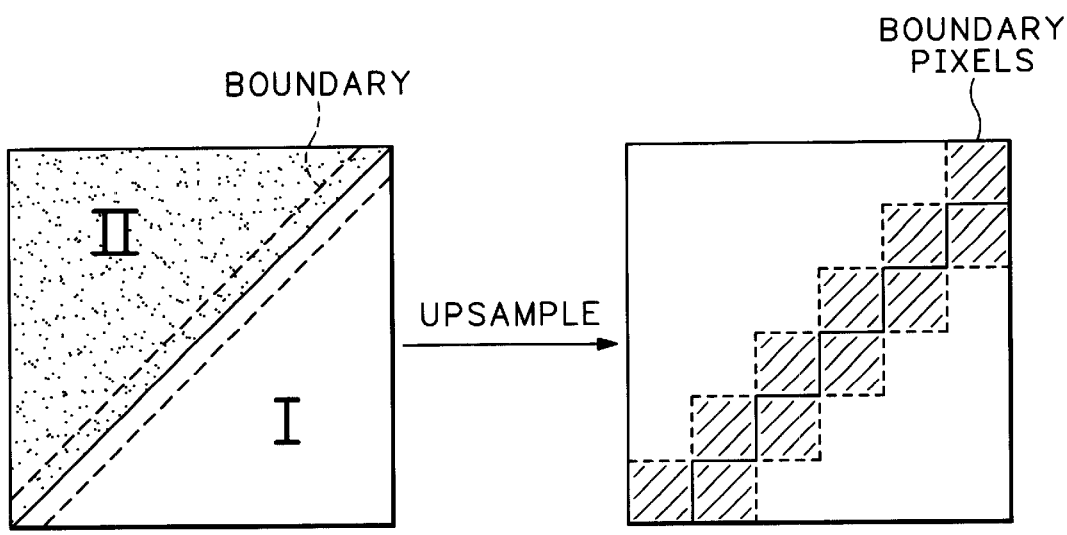
FIG. 3 is a pictorial view of the selection of boundary pixels for refining the pixel-based segmentation mask according to the present invention.
Figure 4:
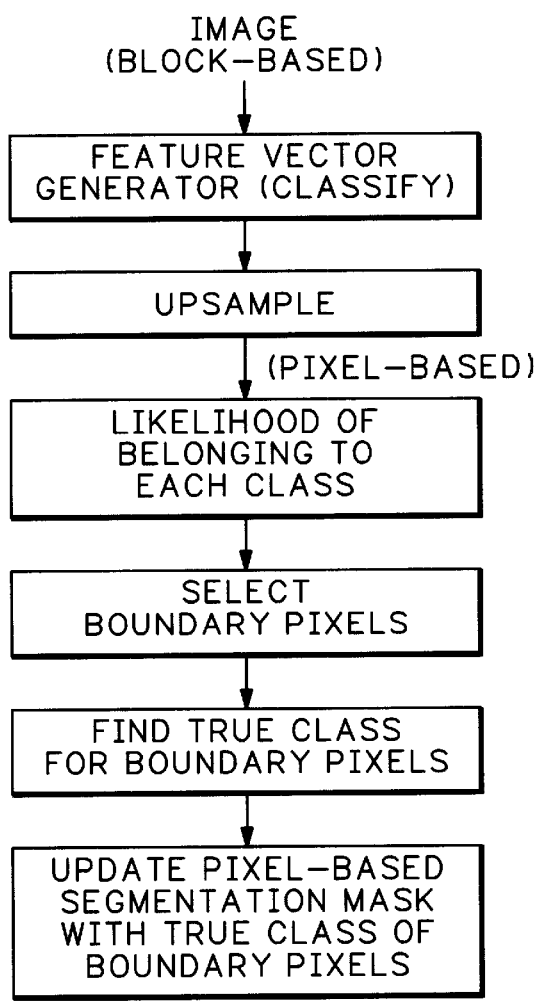
FIG. 4 is a flow chart view of the process for refining the pixel-based segmentation mask according to the present invention.

Only those pixels of the image that border on two or more classes need to be reclassified at the refinement stage. From the block-based segmentation mask a one-sample wide boundary is extracted for each class "k", and those are upsampled to get the "border" samples in the pixel-based segmentation mask, as shown in FIG. 3. At boundary pixel "i", where B is the set of "bordering classes", the true classification of "i" may be defined as $$\arg \max_{k \in B} P_{(k)}(V_{f(i)})$$

This is straight forward, but may produce a noisy result.
Alternatively the true classification may be defined as $$\arg \max_{k \in B} P_{(k)}(V_{f(i)}) * R_{(k)}$$

where $R_{(k)} \triangleq$ (total # blocks in class "k")/(total # of blocks).
Yet another alternative is geometric distance based so that the true classification of pixel "i" is $$\arg \max_{k \in B} P_{(k)}(V_{f(i)}) * d_{(k)}(i)$$

where $d_{(k)}(i)$ is a measure related to the geometric distance of pixel "i" to the "centroid" of all pixels in class "k".

The true classification of the pixels as determined by one of the preceding methods is then used to update the pixel-based segmentation mask to produce a smoother pixel-based segmentation mask for the full resolution image.

In obtaining the mean and covariance as described above the summation may be made on the non-boundary pixels in order to avoid boundary effects.

Thus the present invention provides a method of refining a pixel-based segmentation mask derived by upsampling a block-based segmentation mask having multiple classes for an image to provide a smooth pixel-based segmentation mask for an image by obtaining likelihoods that each pixel belongs to each of the classes, extracting boundary blocks/ pixels, determining the true class for each boundary pixel, and updating the pixel-based segmentation mask with the true class for each boundary pixel.

What is claimed is:

1. A method of mask refining a pixel-based segmentation mask derived by upsampling a block-based segmentation for an image where each block of the block-based segmentation mask is associated with one of a plurality of classes comprising the steps of:

obtaining likelihoods for each pixel of the pixel-based segmentation mask that the pixel belongs to each class;

extracting boundary pixels from the pixel-based segmentation mask that border on more than one class;

for each boundary pixel based on the likelihood for each class determining a true class for the boundary pixel; and updating the pixel-based segmentation mask with the true class for each boundary pixel.

2. The method as recited in claim 1 wherein the determining step comprises the step of determining a probability that each boundary pixel belongs to a particular one of the classes, the class with the highest probability being the true class for the boundary pixel.

3. The method as recited in claim 2 wherein the determining step further comprises the step of weighting the probability as a function of the percentage of the image in the particular one of the classes, the class with the highest weighted probability being the true class for the boundary pixel.

4. The method as recited in claim 2 wherein the determining step further comprises the step of weighting the probability as a function of a geometric distance from the centroid of the particular one of the classes, the class with the highest weighted probability being the true class for the boundary pixel.

* * * * *